Patented Oct. 4, 1927.

1,644,494

UNITED STATES PATENT OFFICE.

DONALD G. ROGERS, OF BUFFALO, NEW YORK, ASSIGNOR TO NATIONAL ANILINE & CHEMICAL COMPANY, INC., OF NEW YORK, N. Y., A CORPORATION OF NEW YORK.

MANUFACTURE OF 2-AMINOANTHRAQUINONE.

No Drawing.     Application filed November 9, 1922.   Serial No. 599,928.

This invention relates to improvements in the manufacture of aminoanthraquinones from anthraquinonesulfonic acids, and particularly of 2-aminoanthraquinone from anthraquinone-2-sulfonic acid or its salts.

It has been heretofore proposed to make aminoanthraquinones by treating anthraquinonesulfonic acids, or their salts, with aqueous ammonia in the presence of an oxidizing agent, and it is stated that a yield of about 81-84 percent of the theoretical can be obtained in this way, for example, of 2-aminoanthraquinone by heating the sodium salt of anthraquinone-2-sulfonic acid with aqueous ammonia and nitrobenzene.

I have found that a greatly increased yield of aminoanthraquinones, amounting in some cases to as much as 90 percent or more of the theoretical, can be obtained by adding ammonium salts, particularly ammonium chloride, in the treatment of anthraquinonesulfonic acids or their salts with aqueous ammonia in the presence of oxidizing agents. The yields which I have obtained in this way are considerably higher than those obtained by any method hitherto proposed, in so far as I am aware.

The invention will be illustrated by the following specific examples, but it is understood that the invention is not limited thereto. The parts are by weight.

*Example 1.*—To 300 parts of ammonium chloride dissolved in 7250 parts of 23 percent aqueous ammonia there is added 1550 parts of silver salt (anhydrous sodium salt of anthraquinone-2-sulfonic acid) and 205 parts nitrobenzene in an autoclave and heated with agitation to 180–185° C. for 18–20 hours, or until the reaction is complete. At the end of this time the excess of ammonia is allowed to escape from the autoclave and is recovered. The crude 2-aminoanthraquinone is then filtered off, washed with water and dried. A yield of about 1030 to 1060 parts of crude 2-aminoanthraquinone of a purity of 94–98 percent can thus be obtained, which corresponds to approximately 87–93 percent of the theoretical yield. If desired, the crude 2-aminoanthraquinone can be purified by methods well known to the art. Also, from the filtrate, any unchanged nitrobenzene, as well as the aniline produced in the reaction, can be recovered in the usual manner.

It will be noted that the amount of nitrobenzene employed is about two-fifteenths of the weight of silver salt used.

If in this example, the 205 parts of nitrobenzene are replaced by 205 parts of potassium chlorate, and the process carried out in a similar manner, there can be obtained a yield of 2-aminoanthraquinone corresponding to about 82 percent of theory as compared to a yield of about 75 percent when no ammonium chloride is employed. In a similar manner, 1-aminoanthraquinone may be prepared from anthraquinone-1-sulfonic acid or its salts.

*Example 2.*—465 parts of the sodium salt of anthraquinone-1.5-disulfonic acid, 4000 parts of 26 percent aqueous ammonia, 153 parts of ammonium chloride, and 79 parts of sodium chlorate are heated together whilst stirring in an autoclave for 10 hours at 180–185° C. After allowing the excess ammonia to escape at the end of the operation, the 1.5-diaminoanthraquinone is filtered off, washed with water and dried. The yield is approximately 10 percent greater than when no ammonium chloride is used. The improvement in the percentage yield is even greater when 92 parts of nitrobenzene is used in place of the 79 parts of sodium chlorate in this example. In a similar manner, 1.8-diaminoanthraquinone, 2.6-diaminoanthraquinone and 2.7-diaminoanthraquinone may be obtained from the corresponding anthraquinone disulfonic acids or their salts.

The process of the present invention is carried out in an analogous manner on using other suitable oxidizing agents. For example, other aromatic nitrocompounds may be employed, such as dinitrobenzene, nitrotoluene, nitronaphthalene, etc., or their sulfonic acids; or, for example, sodium arsenate, sodium nitrate, copper sulfate, etc. It is preferable, however, to employ oxidants which do not of themselves leave or produce insoluble residues which contaminate the aminoanthraquinone as impurities and which are difficult to remove.

It is understood that the invention is not confined to the particulars given in the above examples, as these are merely typical. It has been found advantageous, however, to employ approximately the calculated theoretical quantity of potassium chlorate or sodium chlorate or nitrobenzene required to eliminate the sulfites produced in the reaction by their oxidation to sulfates. On the other hand, about one and one half times the calculated quantity of sodium arsenate appears preferable. Further, a concentration of ammonium chloride throughout the reaction such as to give about 2 to 4 percent solution appears to be sufficient to produce the desired results. Another advantage of using ammonium salts, particularly ammonium chloride, is the reduction of the time apparently required to complete the reaction of the process as compared with the process in which no ammonium chloride is employed. It will be also noted that the present invention employs a less amount of nitrobenzene as oxidant than that heretofore proposed.

I claim:

1. The process of producing an aminoanthraquinone which comprises heating an anthraquinonesulfonic acid with aqueous ammonia in the presence of an organic nitro-compound and of an ammonium salt.

2. The process of producing an aminoanthraquinone which comprises heating an anthraquinonesulfonic acid with aqueous ammonia in the presence of an aromatic nitro-hydrocarbon and of an ammonium salt.

3. The process of producing an aminoanthraquinone which comprises heating an anthraquinonemonosulfonic acid with aqueous ammonia in the presence of an aromatic nitro-compound and of ammonium chloride.

4. The process of producing 2-aminoanthraquinone which comprises heating the sodium salt of anthraquinone-2-sulfonic acid with aqueous ammonia in the presence of nitrobenzene and of ammonium salts, the amount of nitrobenzene employed being about two-fifteenths of the weight of sodium salt of anthraquinone-2-sulfonic acid.

5. The process of producing 2-aminoanthraquinone which comprises heating anthraquinone-2-sulfonic acid with aqueous ammonia in the presence of aromatic nitro-compounds and of ammonium chloride.

6. The process of producing 2-aminoanthraquinone which comprises heating the sodium salt of anthraquinone-2-sulfonic acid with aqueous ammonia in the presence of nitrobenzene and of ammonium chloride.

7. In the production of 2-aminoanthraquinone by heating the soluble salts of anthraquinone-2-sulfonic acid with aqueous ammonia in the presence of nitrobenzene, the step which comprises the introduction of ammonium chloride in the reaction mixture thereof.

In testimony whereof I affix my signature.

DONALD G. ROGERS.